_United States Patent Office_

2,858,332
Patented Oct. 28, 1958

2,858,332

**AMINE SALTS OF MONOHALOALKYLPHOS-
PHONIC ACIDS**

Forrest J. Watson and Rupert C. Morris, Berkeley, and
John L. Van Winkle, San Lorenzo, Calif., assignors to
Shell Development Company, New York, N. Y., a
corporation of Delaware No Drawing. Application August 17, 1956
Serial No. 604,619

5 Claims. (Cl. 260—501)

This invention relates to a new class of organic compounds of phosphorus, particularly to oil-soluble primary amine salts of alpha-monochloroalkylphosphonic acids.

Generically, the new compounds of this invention are the salts of higher highly-branched aliphatic primary amines and phosphonic acids having the formula:

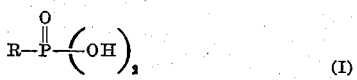

wherein R represents a monochloroalkyl group bonded to the phosphorus atom by a carbon-to-phosphorus bond, and containing up to four, and preferably from one to two carbon atoms. In the group R the chlorine atom is bonded to the carbon atom of the haloalkyl group which is in the alpha position relative to the phosphorus atom.

Thus, the new compounds may also be characterized by the formulas:

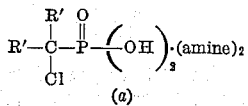

and

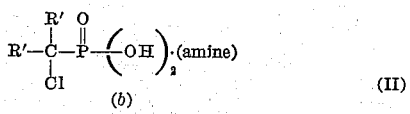

wherein R' represents a hydrogen atom or an alkyl group, the total number of carbon atoms in the alkyl group(s) represented by R' being three, and "amine" represents a higher highly branched aliphatic primary amine. Compounds of this class wherein both of R' are hydrogen atoms, and those wherein one of R' is a hydrogen atom and the other R' is a methyl group are of particular interest.

The new compounds include both the full amine salts and the partial amine salts of the defined phosphonic acids—that is, both of the acidic groups of the phosphonic acid may be neutralized by the amine (IIa, above) or but one of the acidic groups of the phosphonic acids may be neutralized by the amine (IIb, above). The full amine salts—wherein both acid groups of the phosphonic acid are neutralized by the amine—are preferred for some applications and the partial amine salt for others where a higher reactivity is needed.

The alpha-monochloroalkylphosphonic acids are conveniently prepared by reacting a lower aliphatic aldehyde with phosphorus trichloride at a temperature of about 250° C. to form the alpha-monochloroalkylphosphonyl dichloride, which is then hydrolyzed to give the desired acid. This method for preparing the alpha-monochloroalkylphosphonic acids is described in detail by Barnard et al., Canadian Journal of Chemistry, vol. 31, pages 976 to 983 (1953), and in the earlier literature references cited therein.

Suitable alpha-monochloroalkylphosphonic acids for preparing the new salts include monochloromethylphosphonic acid, 1-monochloroethylphosphonic acid, 1-monochloropropylphosphonic acid, 1-chloro-1-methyl-ethylphosphonic acid, 1-chloro-2-methyl-propylphosphonic acid, 1-chloro-butylphosphonic acid and 1-chloro-1-methyl-propylphosphonic acid.

Suitable amines for preparing the salts of the invention are the aliphatic primary amines wherein the aliphatic group is a higher highly branched aliphatic group, containing at least eight carbon atoms. Preferably the amine is a 1,1- or 2,2-dialkyl alkyl amine containing a tertiary or quaternary carbon atom in the molecule as represented by the formulas:

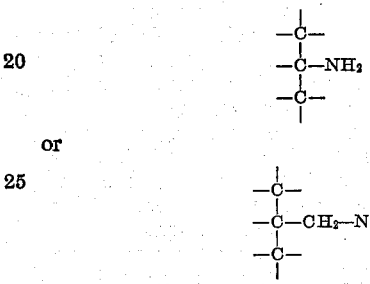

Primary amines for use in forming the salts of this invention can be prepared by any suitable means, a convenient method being that described in the U. S. Office of the Publication Board Report No. 88843, or by converting primary branched-chain alcohols as produced in the Oxo process from branched-chain olefins as is fully described by P. W. Sherwood in the Oil and Gas Journal, June 9, 1949, page 71, and in the February 1953 issue of Petroleum Processing, to the corresponding nitriles and converting the nitrile to the amine by catalytic hydrogenation. Another method is to convert highly-branched alcohols to the corresponding halides and form the amines derived from the halide in the customary manner, such as by reacting the halide with ammonia.

The tertiary alkyl primary amines, containing as the tertiary alkyl radical the radical of the polyisobutylene, polypropylenes and mixtures thereof are preferred. Accordingly, 1,1,3,3-tetramethylbutylamine (from the amination of diisobutylene), 1,1,3,3,5,5-hexamethylhexylamine (from triisobutylene), 1,1,3,3,5,5,7,7-octamethyloctylamine (from tetraisobutylene) and 1,1,3,3,5,5,7,7,9,9-decamethyldecylamine (from pentaisobutylene) are preferred amines, which are suitably used individually or as admixtures thereof. In addition to these tertiary alkyl primary amines, tertiary-alkylmethyl primary amines, such as 2,2,4,4-tetramethylpentylamine and 2,4,4,6,6-hexamethylheptylamine and the like are suitable.

Other tertiary alkyl primary amines which can be used include the $C_8$ and higher amines of this type containing up to 49 carbon atoms mentioned in U. S. Patents Nos. 2,160,058, 2,606,923 and 2,611,782, such as tert.-tridecylamine

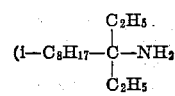

as well as isoheptyldiethylcarbinylamine, isooctylethylpropylcarbinylamine, and the like. Primary amines of this type are commercially available from Rohm and Haas Co., under the trade name of "Primenes."

The following are the properties of some amines which can be used to form the new amine salts:

Table 1.—Properties

|  | A₁ | A₂ |
| --- | --- | --- |
| Formula | Principally t-C₁₂H₂₅NH₂ to t-C₁₅H₃₁NH₂. | Principally t-C₁₈H₃₇NH₂ to t-C₂₄H₄₉NH₂. |
| Molecular weight | Principally 185–227 | Principally 269–353. |
| Average molecular weight | 191 | 315. |
| Specific gravity (25° C.) | 0.812 | 0.840. |
| Refractive index (25° C.) | 1.423 | 1.456. |
| Boiling point (or range) | 5–90% at 223–240° C. at 760 millimeters mercury pressure. | 5–20% at 265–308° C. at 760 millimeters mercury pressure. |

The novel salts of this invention can be prepared by direct neutralization of the corresponding alpha-monochloroalkyl phosphonic acid with a substantially stoichiometrically equivalent amount of the amine, i. e., one mole of the amine per equivalent of acid. Although the neutralization reaction, which occurs at normal or moderately elevated temperatures, can be effected between the pure selected alpha-monochloroalkylphosphonic acid and the pure selected amine, it may be carried out in the presence of an inert diluent or solvent, such as a hydrocarbon solvent, or an ethereal, a ketonic, an alcoholic or like solvent. Although the amount of the amine may be so adjusted that substantially complete neutralization of the amine and of the alpha-monochloroalkylphosphonic acid is obtained, in all cases it is not necessary to employ fully equivalent amounts. For example, when it is desired to prepare the salt of the amine and the alpha-monochloroalkylphosphonic acid for use as an emulsifying or surface-active agent, it often may be advantageous to have present in the final composition an excess of the long-chain amine. This evidently may be accomplished simply by using a sufficient excess of the amine when neutralizing the alpha-monochloroalkylphosphonic acid. Also, of the two acidic groups of the dibasic alpha-monochloroalkylphosphonic acids, but one may be neutralized by reducing the amount of the amine to about half of the full equivalent amount. It also will be apparent that mixtures of amine salts of this invention can be prepared by employing either or both mixtures of amines and mixtures of alpha-monochloroalkylphosphonic acids in the neutralization. The novel amine salts of the invention can, if desired, be purified by crystallization from solvents or by other applicable procedures which will be apparent to the art.

For example, monochloromethylphosphonic acid was reacted at a temperature of approximately 100° C. with a mixture of tertiary C₁₈ to C₂₄ primary amine (mixture A₂ of Table 1) in an amount sufficient to neutralize the total acidity of the acid—i. e., one mole of acid was mixed with two moles of the amine. The product is represented by the formula

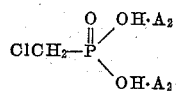

or equivalently

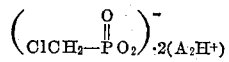

This salt was completely soluble in mineral oil, was non-corrosive and possessed excellent extreme pressure properties.

Using two moles of a mixture of tertiary C₁₂ to C₁₅ primary amines (mixture A₁ of Table 1), the same type of salt was formed, the final product having the formula

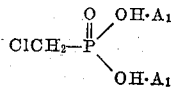

or equivalently

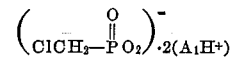

Another excellent non-corrosive extreme pressure additive having good oil solubility was prepared by the same procedure, except that only one mole amine was charged per mole of acid. The amine used was mixture A₂. The product formed had the formula:

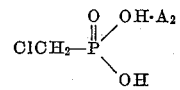

or equivalently

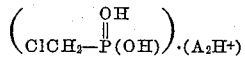

The full amine salts of alpha-chloroethylphosphonic acid with mixture A₁, were prepared by stirring a mixture of the acid and the amine in the molar proportion of 1:2 at a temperature of approximately 100° C. The product had the formula:

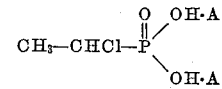

or equivalently

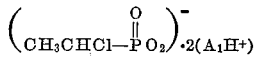

The preferred amine salts of the invention are the A₁ and A₂ salts of monochloromethylphosphonic acid and alpha-chloroethylphosphonic acid.

The novel salts of this invention are useful as anti-corrosion agents, as additives for lubricants of the predominantly hydrocarbon variety as well as of the synthetic types, and as additives for improving the properties of materials suitable for use as cutting fluids, coating compositions, textile-treating compositions, and flame-proofing agents. The salts may be employed as surface-active agents, wherein they may contribute in addition to their surface-active characteristics useful rust or corrosion inhibiting properties which reduce deleterious effects of the medium, e. g., oil, emulsion, or the like, upon metal parts with which it comes into contact. The compounds of this invention include biologically active compounds which are useful as insecticides, fungicides, and the like. The new amine salts may be added in small amounts, with or without other additives of conventional types, to lubricants such as hydrocarbon oils, synthetic oils such as polymers and copolymers of alkylene glycols and alkylene oxides, or organic esters, such as 2-ethylhexyl sebacate, etc., to provide lubricants having greatly enhanced extreme pressure properties, that is, greatly enhanced suitability to use under conditions of extreme pressure upon the lubricant film as is encountered in hypoid gears, heavily loaded bearings, and like applications. Solutions thereof in the same or lighter vehicles are valuable as cutting oils or ingredients of cutting oils, and to this end there may be employed as the vehicle light naphthas, kerosene, aromatic solvents, and the like, as well as the more viscous or heavier oils. Such cutting oils may be employed as emulsions in water. The salts of this invention are also useful as additives to hydraulic fluids for example, phosphonate ester-base hydraulic fluids, and synthetic carboxylic acid ester-base hydraulic fluid wherein they serve to prolong the life of mechanical pumps and other equipment employed in or for transmission of power by means of such fluids. The salts of the invention also can be used for flame-proofing of textiles, paper, wood, and other flammable materials.

The new amine salts of alpha-monochloroalkylphosphonic acids can be used in amounts ranging from about 0.01% to about 10% by weight, and preferably are used in amounts ranging from about 0.1% to about 5% by weight, of the lubricating or other composition.

The outstanding properties imparted by the amine salts of this invention to lubricating compositions to which they are added is evidenced by the results of tests made on such compositions and presented in Table 2.

Lubricating compositions containing the new amine salts were tested as follows:

(1) The rust-preventing properties of the compositions were ascertained according to the L-13 rust test described in the 1946 CRC Handbook published by the Co-ordination Research Council. Duration of the test: 4 hours. Test temperature: 82° C.

(2) The non-corrosive properties of the compositions were ascertained by a bearing stain test, which consisted of immersing a small clean Timken bearing in the composition being tested and heating the composition to 150° C. for 65 hours. The bearing is then removed, solvent washed and the staining of the bearing cup and cone determined by visual observation. The amount of staining is expressed as a number from 0 to 10, a perfectly unstained bearing having a rating of 0, and a heavily stained bearing having a rating of 10.

(3) The load carrying capacity of the compositions was determined by two tests:

a. The four-ball test described in "Engineering," volume 136, July 13, 1933. The test results are reported as the initial seizure load (ISL), that is, the load in kilograms which must be applied to the test machine to cause seizure of the test balls.

b. A reverse hypoid gear test, in which the composition is tested in a hypoid gear machine similar to the machine described in the L-19 test described in the CRC Handbook referred to in (1) above, with the exception that the gears are run in the reverse direction. The gears were run at 4000 R. P. M., so that the test measures the load carrying characteristics of the compositions under high-speed, low-torque conditions. The test results are reported as the number of horsepower which may be applied to the machine without causing scoring of the gears. The test and the results thereof are quite similar to the L-19 test and the results obtained according to that test.

Table 2

[Composition tested: Test compound dissolved in the base oil to give 0.12% by weight of phosphorus in the final composition.]

| Base Oil | Test Compound | L-13 | Bearing Stain cup/cone 10 = heavy stain 0 = no stain | Reverse Hypoid, H. P. | 4-Ball ISL, kg. |
|---|---|---|---|---|---|
| SAE 90 Mineral Oil | Salt¹ of amine "A₁," of Table 1 and Monochloromethyl phosphonic acid. | Pass | 2/1 | 154 | 158-178 |
|  | Salt¹ of amine "A₁" and alpha-chloroethyl phosphonic acid. | Pass |  | 140 | 158-178 |
|  | None. | Fail |  |  | 40-45 |
| Commercial dibutyl derivative of polyoxypropylene glycol (Ucon DLB-190B) having a viscosity of 190 SUS at 100° F. | Salt¹ of amine "A₁" and monochloromethyl phosphonic acid. |  |  |  | 178-200 |
|  | None. |  |  |  | 56-63 |
| Di-2-ethylhexyl sebacate | Salt¹ of amine "A₁" and monochloromethyl phosphonic acid. |  |  |  | 200-224 |
|  | None. |  |  |  | 40-45 |
| Sulfurized pale oil | Salt² of amine "A₁" and monochloromethyl phosphonic acid. |  |  |  | 224-250 |
|  | None. |  |  |  | 40-45 |
| A pale oil having a viscosity of 170 SUS at 100° F. | Salt² of amine "A₁" and monochloromethyl phosphonic acid. |  |  |  | 224-250 |
|  | None. |  |  |  | 40-45 |

¹ Neutral amine salt—total acid neutralized.
² Partial amine salt—strong acid only neutralized.

We claim as our invention:

1. A salt of a high-molecular weight highly-branched aliphatic primary amine containing from 8 to 49 carbon atoms and a dibasic alpha-monochloroalkylphosphonic acid in which the chloroalkyl group contains up to four carbon atoms.

2. The salt of claim 1 wherein the amine contains a tertiary alkyl structure.

3. The salt of claim 1 wherein the amine is a mixture of amines having the formula $t\text{-}C_nH_{2n+1}\cdot NH_2$, wherein $n$ is a whole number from 12 to 15.

4. The salt of claim 1 wherein the amine is a mixture of amines having the formula $t\text{-}C_nH_{2n+1}\cdot NH_2$, wherein $n$ is a whole number from 18 to 24.

5. A salt of a high-molecular weight highly-branched aliphatic primary amine containing from 8 to 49 carbon atoms and monochloromethylphosphonic acid.

References Cited in the file of this patent

UNITED STATES PATENTS 2,674,616    Morris _____ Apr. 6, 1954

FOREIGN PATENTS 705,308    Great Britain _____ Mar. 10, 1954